(12) United States Patent
Yuen

(10) Patent No.: US 8,411,616 B2
(45) Date of Patent: Apr. 2, 2013

(54) PRE-SCAN FOR WIRELESS CHANNEL SELECTION

(75) Inventor: Michael Yuen, Waltham, MA (US)

(73) Assignee: Piccata Fund Limited Liability Company, Wilmington, DE (US)

( * ) Notice: Subject to any disclaimer, the term of this patent is extended or adjusted under 35 U.S.C. 154(b) by 1268 days.

(21) Appl. No.: 11/556,249

(22) Filed: Nov. 3, 2006

(65) Prior Publication Data

US 2007/0097940 A1    May 3, 2007

Related U.S. Application Data

(60) Provisional application No. 60/733,142, filed on Nov. 3, 2005.

(51) Int. Cl.
*H04W 4/00* (2009.01)

(52) U.S. Cl. .................. 370/328; 370/324; 370/329

(58) Field of Classification Search .................. None
See application file for complete search history.

(56) References Cited

U.S. PATENT DOCUMENTS

| | | | |
|---|---|---|---|
| 5,212,831 A | 5/1993 | Chuang et al. |
| 5,345,597 A | 9/1994 | Strawczynski et al. |
| 5,345,598 A | 9/1994 | Dent |
| 5,386,589 A | 1/1995 | Kanai |
| 5,475,864 A | 12/1995 | Hamabe |
| 5,493,694 A | 2/1996 | Vlcek et al. |
| 5,524,280 A | 6/1996 | Douthitt et al. |
| 5,541,954 A | 7/1996 | Emi |
| 5,551,057 A | 8/1996 | Mitra |
| 5,574,968 A | 11/1996 | Olds et al. |
| 5,574,982 A | 11/1996 | Almgren et al. |
| 5,606,727 A | 2/1997 | Ueda |
| 5,633,888 A | 5/1997 | Stewart |
| 5,724,346 A | 3/1998 | Kobayashi et al. |
| 5,740,534 A | 4/1998 | Ayerst et al. |
| 5,815,811 A | 9/1998 | Pinard et al. |
| 5,845,212 A | 12/1998 | Tanaka |
| 5,852,780 A | 12/1998 | Wang et al. |
| 5,886,988 A | 3/1999 | Yun et al. |

(Continued)

FOREIGN PATENT DOCUMENTS

WO    WO 2004/059933 A1    7/2004

OTHER PUBLICATIONS

IEEE, Wireless LAN Mediumj Access Control (MAC) and Physical Layer (PHY) specifications, Standard 802.11, 1999 edition, Reference No. ISO/IEC 8802-11:1999(E), 528 Pages.

(Continued)

*Primary Examiner* — Rafael Pérez-Gutiérrez
*Assistant Examiner* — German Viana Di Prisco
(74) *Attorney, Agent, or Firm* — Connolly Bove Lodge & Hutz LLP

(57) ABSTRACT

A system and method for pre-scanning for a wireless channel selection is provided. The methodology is executed by a first fixed location wireless device to improve initial channel selection in a wireless network where a plurality of fixed location wireless devices is contemporaneously initialized. On a predetermined channel, there is a transmission of at least one message including an identifier of the first device. On the predetermined channel, there is a transmission of at least one message indicative of readiness to transition to a subsequent processing step. The methodology also commences scanning for channel selection purposes.

8 Claims, 3 Drawing Sheets

U.S. PATENT DOCUMENTS

| | | | |
|---|---|---|---|
| 5,923,702 A | 7/1999 | Ueda | |
| 5,924,030 A | 7/1999 | Rautiola et al. | |
| 5,933,420 A | 8/1999 | Jaszewski et al. | |
| 5,963,848 A | 10/1999 | D'Avello | |
| 5,987,062 A | 11/1999 | Engwer et al. | |
| 6,018,663 A | 1/2000 | Karlsson et al. | |
| 6,029,074 A | 2/2000 | Irvin | |
| 6,052,562 A | 4/2000 | Dorenbosch | |
| 6,052,596 A | 4/2000 | Barnickel | |
| 6,111,867 A | 8/2000 | Mann | |
| 6,131,015 A | 10/2000 | Hill et al. | |
| 6,144,855 A | 11/2000 | Slovin | |
| 6,157,626 A | 12/2000 | Nakamura et al. | |
| 6,195,554 B1 | 2/2001 | H'mimy et al. | |
| 6,198,924 B1 | 3/2001 | Ishii et al. | |
| 6,208,629 B1 | 3/2001 | Jaszewski et al. | |
| 6,208,631 B1 | 3/2001 | Kim | |
| 6,215,779 B1 | 4/2001 | Bender | |
| 6,215,811 B1 | 4/2001 | Yuen | |
| 6,259,918 B1 | 7/2001 | Labonte et al. | |
| 6,266,537 B1 | 7/2001 | Kashitani et al. | |
| 6,301,482 B1 | 10/2001 | Shohara | |
| 6,332,007 B1 | 12/2001 | Wu et al. | |
| 6,332,077 B1 | 12/2001 | Wu et al. | |
| 6,334,047 B1 | 12/2001 | Andersson et al. | |
| 6,374,085 B1 | 4/2002 | Saints et al. | |
| 6,430,408 B1 | 8/2002 | Dorenbosch | |
| 6,452,498 B2 | 9/2002 | Stewart | |
| 6,515,971 B2 | 2/2003 | Nelson et al. | |
| 6,522,875 B1 | 2/2003 | Dowling et al. | |
| 6,522,881 B1 | 2/2003 | Feder et al. | |
| 6,542,716 B1 | 4/2003 | Dent et al. | |
| 6,560,462 B1 | 5/2003 | Ravi et al. | |
| 6,574,474 B1 | 6/2003 | Nielsen | |
| 6,574,477 B1 | 6/2003 | Rathunde | |
| 6,580,700 B1 | 6/2003 | Pinard et al. | |
| 6,580,704 B1 | 6/2003 | Wellig et al. | |
| 6,591,103 B1 | 7/2003 | Dunn et al. | |
| 6,597,671 B1 | 7/2003 | Ahmadi et al. | |
| 6,633,765 B1 * | 10/2003 | Maggenti | 455/503 |
| 6,636,737 B1 | 10/2003 | Hills et al. | |
| 6,639,904 B1 | 10/2003 | Boyer et al. | |
| 6,657,981 B1 | 12/2003 | Lee et al. | |
| 6,681,256 B1 | 1/2004 | Kuntze et al. | |
| 6,690,944 B1 | 2/2004 | Lee et al. | |
| 6,693,915 B1 | 2/2004 | Lappetelainen et al. | |
| 6,729,929 B1 | 5/2004 | Sayers et al. | |
| 6,732,163 B1 | 5/2004 | Halasz | |
| 6,738,599 B2 | 5/2004 | Black et al. | |
| 6,741,863 B1 | 5/2004 | Chiang et al. | |
| 6,757,319 B1 | 6/2004 | Parsa et al. | |
| 6,760,746 B1 | 7/2004 | Schneider | |
| 6,760,748 B1 | 7/2004 | Hakim | |
| 6,760,877 B1 | 7/2004 | Lappetelainen et al. | |
| 6,788,940 B2 | 9/2004 | Bhatoolaul et al. | |
| 6,795,407 B2 | 9/2004 | Chesson | |
| 6,801,777 B2 | 10/2004 | Rusch | |
| 6,850,499 B2 | 2/2005 | Wheatley et al. | |
| 6,870,815 B2 | 3/2005 | McFarland et al. | |
| 6,888,792 B2 | 5/2005 | Gronke | |
| 6,898,198 B1 | 5/2005 | Ryan et al. | |
| 6,904,021 B2 | 6/2005 | Belcea | |
| 6,905,021 B2 | 6/2005 | Polumbaum et al. | |
| 6,907,229 B2 | 6/2005 | Shpak | |
| 6,930,986 B2 * | 8/2005 | Dempo et al. | 370/310.2 |
| 6,941,143 B2 | 9/2005 | Mathur | |
| 6,954,646 B2 | 10/2005 | Churt | |
| 6,959,001 B1 | 10/2005 | Parks | |
| 6,973,316 B1 | 12/2005 | Hayakawa | |
| 6,993,334 B2 | 1/2006 | Andrus et al. | |
| 6,996,127 B2 | 2/2006 | Rezaiifar et al. | |
| 7,016,696 B2 | 3/2006 | Vincent et al. | |
| 7,020,439 B2 | 3/2006 | Sinivaara et al. | |
| 7,035,314 B1 | 4/2006 | Linsky | |
| 7,050,479 B1 | 5/2006 | Kim | |
| 7,054,640 B2 | 5/2006 | Bing et al. | |
| 7,076,220 B2 | 7/2006 | Backes et al. | |
| 7,133,386 B2 | 11/2006 | Holur et al. | |
| 7,136,665 B2 | 11/2006 | Ida et al. | |
| 7,146,300 B2 | 12/2006 | Zammit et al. | |
| 7,162,507 B2 | 1/2007 | Carter | |
| 7,167,696 B2 | 1/2007 | Backes et al. | |
| 7,173,918 B2 | 2/2007 | Awater et al. | |
| 7,206,297 B2 | 4/2007 | Backes | |
| 7,206,840 B2 | 4/2007 | Choi et al. | |
| 7,215,661 B2 | 5/2007 | Backes et al. | |
| 7,269,260 B2 | 9/2007 | Adachi et al. | |
| 7,280,520 B2 | 10/2007 | Melville et al. | |
| 7,359,363 B2 | 4/2008 | Sakai | |
| 7,486,616 B2 | 2/2009 | Kitchin | |
| 2001/0010460 A1 | 8/2001 | Miller et al. | |
| 2001/0046879 A1 | 11/2001 | Schramm et al. | |
| 2001/0048744 A1 | 12/2001 | Kimura | |
| 2002/0012332 A1 | 1/2002 | Tiedemann et al. | |
| 2002/0016180 A1 | 2/2002 | Derosier et al. | |
| 2002/0038336 A1 | 3/2002 | Abileah et al. | |
| 2002/0042268 A1 | 4/2002 | Cotanis | |
| 2002/0060995 A1 | 5/2002 | Cervello et al. | |
| 2002/0065081 A1 | 5/2002 | Barany et al. | |
| 2002/0085719 A1 | 7/2002 | Crosbie | |
| 2002/0090966 A1 | 7/2002 | Hansen et al. | |
| 2002/0097696 A1 | 7/2002 | Kossi et al. | |
| 2002/0141368 A1 | 10/2002 | Cheung et al. | |
| 2002/0141375 A1 | 10/2002 | Choi | |
| 2002/0142771 A1 | 10/2002 | Saifullah et al. | |
| 2002/0147031 A1 | 10/2002 | Hood, III | |
| 2002/0172186 A1 | 11/2002 | Larsson | |
| 2002/0176437 A1 | 11/2002 | Busch et al. | |
| 2002/0181417 A1 | 12/2002 | Malhotra et al. | |
| 2002/0188723 A1 | 12/2002 | Choi et al. | |
| 2002/0191554 A1 | 12/2002 | Kondo | |
| 2002/0191561 A1 | 12/2002 | Chen et al. | |
| 2002/0193113 A1 | 12/2002 | Sayeedi et al. | |
| 2002/0193133 A1 | 12/2002 | Shibutani | |
| 2003/0002456 A1 | 1/2003 | Soomro et al. | |
| 2003/0012174 A1 | 1/2003 | Bender et al. | |
| 2003/0022686 A1 | 1/2003 | Soomro et al. | |
| 2003/0022692 A1 | 1/2003 | Ueno | |
| 2003/0035442 A1 | 2/2003 | Eng | |
| 2003/0036374 A1 | 2/2003 | English et al. | |
| 2003/0040319 A1 | 2/2003 | Hansen et al. | |
| 2003/0050066 A1 | 3/2003 | Tobe et al. | |
| 2003/0076852 A1 | 4/2003 | Fukui | |
| 2003/0081654 A1 | 5/2003 | Cooklev et al. | |
| 2003/0083095 A1 | 5/2003 | Liang | |
| 2003/0086437 A1 | 5/2003 | Benveniste | |
| 2003/0087646 A1 | 5/2003 | Funato et al. | |
| 2003/0100328 A1 | 5/2003 | Klein et al. | |
| 2003/0134642 A1 | 7/2003 | Kostic et al. | |
| 2003/0174667 A1 | 9/2003 | Krishnamurthi et al. | |
| 2003/0181211 A1 | 9/2003 | Razavilar et al. | |
| 2003/0185233 A1 | 10/2003 | Ji et al. | |
| 2003/0190915 A1 | 10/2003 | Rinne et al. | |
| 2003/0198305 A1 | 10/2003 | Taylor et al. | |
| 2003/0207699 A1 | 11/2003 | Shpak | |
| 2003/0223354 A1 | 12/2003 | Olszewski | |
| 2003/0231655 A1 | 12/2003 | Kelton et al. | |
| 2003/0236064 A1 | 12/2003 | Shiohara et al. | |
| 2004/0001467 A1 | 1/2004 | Cromer et al. | |
| 2004/0003285 A1 | 1/2004 | Whelan et al. | |
| 2004/0008645 A1 | 1/2004 | Janevski et al. | |
| 2004/0014422 A1 | 1/2004 | Kallio | |
| 2004/0022219 A1 | 2/2004 | Mangold et al. | |
| 2004/0023629 A1 | 2/2004 | Klank | |
| 2004/0023674 A1 | 2/2004 | Miller | |
| 2004/0027284 A1 | 2/2004 | Leeper et al. | |
| 2004/0037247 A1 | 2/2004 | Ngo | |
| 2004/0038697 A1 | 2/2004 | Attar et al. | |
| 2004/0039817 A1 | 2/2004 | Lee et al. | |
| 2004/0047335 A1 | 3/2004 | Proctor et al. | |
| 2004/0054767 A1 | 3/2004 | Karaoguz et al. | |
| 2004/0054774 A1 | 3/2004 | Barber et al. | |
| 2004/0057507 A1 | 3/2004 | Rotstein et al. | |
| 2004/0066759 A1 | 4/2004 | Molteni et al. | |
| 2004/0071110 A1 | 4/2004 | Guey et al. | |
| 2004/0095902 A1 | 5/2004 | Larola et al. | |
| 2004/0121749 A1 | 6/2004 | Cui et al. | |

| | | | |
|---|---|---|---|
| 2004/0121765 A1 | 6/2004 | Idnani et al. | |
| 2004/0132458 A1 | 7/2004 | Bing et al. | |
| 2004/0137915 A1 | 7/2004 | Diener et al. | |
| 2004/0146021 A1 | 7/2004 | Fors et al. | |
| 2004/0151137 A1 | 8/2004 | McFarland et al. | |
| 2004/0156336 A1 | 8/2004 | McFarland et al. | |
| 2004/0157613 A1 | 8/2004 | Steer et al. | |
| 2004/0160908 A1 | 8/2004 | Perlman | |
| 2004/0162084 A1 | 8/2004 | Wang | |
| 2004/0165557 A1 | 8/2004 | Backes et al. | |
| 2004/0166849 A1 | 8/2004 | Hawe | |
| 2004/0166867 A1 | 8/2004 | Hawe | |
| 2004/0174852 A1 | 9/2004 | Backes et al. | |
| 2004/0192279 A1 | 9/2004 | Backes et al. | |
| 2004/0202141 A1 | 10/2004 | Sinivaara et al. | |
| 2004/0203783 A1 | 10/2004 | Wu et al. | |
| 2004/0203828 A1 | 10/2004 | Mirchandani et al. | |
| 2004/0203863 A1 | 10/2004 | Huomo | |
| 2004/0208151 A1 | 10/2004 | Haverinen et al. | |
| 2004/0214572 A1 | 10/2004 | Thompson et al. | |
| 2004/0214590 A1 | 10/2004 | Al-Housami et al. | |
| 2004/0219920 A1 | 11/2004 | Love et al. | |
| 2004/0266351 A1 | 12/2004 | Chuah et al. | |
| 2005/0003827 A1 | 1/2005 | Whelan | |
| 2005/0013275 A1 | 1/2005 | Black et al. | |
| 2005/0026610 A1 | 2/2005 | Backes et al. | |
| 2005/0032506 A1 | 2/2005 | Walker | |
| 2005/0047354 A1 | 3/2005 | Zeira et al. | |
| 2005/0074030 A1 | 4/2005 | Cho et al. | |
| 2005/0090250 A1 | 4/2005 | Backes | |
| 2005/0117524 A1 | 6/2005 | Lee et al. | |
| 2005/0118981 A1 | 6/2005 | Laroia et al. | |
| 2005/0124335 A1* | 6/2005 | Cave et al. | 455/422.1 |
| 2005/0130677 A1 | 6/2005 | Muenier et al. | |
| 2005/0148336 A1 | 7/2005 | Nagato et al. | |
| 2005/0152480 A1 | 7/2005 | Chang et al. | |
| 2005/0180356 A1* | 8/2005 | Gillies et al. | 370/329 |
| 2005/0190730 A1 | 9/2005 | Dore et al. | |
| 2005/0195786 A1 | 9/2005 | Shpak | |
| 2005/0232200 A1 | 10/2005 | Jeong et al. | |
| 2005/0245269 A1 | 11/2005 | Demirhan et al. | |
| 2005/0250511 A1 | 11/2005 | Xiao et al. | |
| 2006/0013179 A1* | 1/2006 | Yamane | 370/338 |
| 2006/0068781 A1 | 3/2006 | Lam | |
| 2006/0082489 A1 | 4/2006 | Liu et al. | |
| 2006/0089138 A1 | 4/2006 | Smith et al. | |
| 2006/0094371 A1 | 5/2006 | Nguyen | |
| 2006/0120302 A1 | 6/2006 | Poncini et al. | |
| 2007/0041398 A1 | 2/2007 | Benveniste | |
| 2007/0058581 A1 | 3/2007 | Benveniste | |
| 2007/0111730 A1 | 5/2007 | Baker et al. | |
| 2007/0286143 A1* | 12/2007 | Olson et al. | 370/338 |
| 2007/0286425 A1 | 12/2007 | Adachi et al. | |

OTHER PUBLICATIONS

Michael Barr, Toward a Smaller Java, Embedded.com, Jun. 14, 2002, pp. 1-9.

Moustafa Youssef, "Handling Samples Correlation in the Horus System", IEEE INFOCOM 2004.

Kin K. Leung "Integrated Link Adaptation and Power Control for Wireless IP Networks", At&T Labs—research, Jan. 19, 2000.

Ana Zapater et al., "Development and implementation of a Bluetooth Networking Infrastructure for the a Notebook—University Scenario", Institute of Communications Engineering, University of Hannover, May 13, 2003.

Walter Klotz, "Graph Coloring Algorithms", 1999.

Brent N. Chun et. Al., "Market-based Proportional esource Sharing for Flusters", University of California at Berkeley computer Science Division, Sep. 1999.

The Four Color Theorem, Web page, author(s) unknow, updated Nov. 13, 1995.

IEEE Std 802.11h-2003, IEEE Standard for Information technology Telecommunications and Information exchange between systems Local and metropolitan area networks Specific requirements, Oct. 14, 2003, 59 pages.

U.S. Appl. No. 10/781,204, Apparatus for Adjusting Channel Interference between Devices in a Wireless Network.

U.S. Appl. No. 10/781,159, Patent No. 7,215,973, Apparatus for Adjusting Channel Interference between Access Points in a Wireless Network.

U.S. Appl. No. 10/781,219, Patent No. 7,369,858, Apparatus for Self-Adjusting Power at a Wireless Station to Reduce Inter-channel Interference.

U.S. Appl. No. 10/781,535, Patent No. 7,228,149, Method for Adjusting Channel Interference between Devices in a Wireless Network.

U.S. Appl. No. 10/781,474, Patent No. 7,221,954, Method for Adjusting Channel Interference between Access Points in a Wireless Network.

U.S. Appl. No. 10/780,775, Patent No. 7,295,537, Method for Self-Adjusting Power at a Wireless Station to Reduce Inter-channel Interference.

U.S. Appl. No. 10/781,191, Patent No. 7,653,407, Program for Adjusting Channel Interference between Devices in a Wireless Network.

U.S. Appl. No. 10/781,137, Program for Adjusting Channel Interference between Access Points in a Wireless Network.

U.S. Appl. No. 10/781,536, Patent No. 7,149,539, Program for Self-Adjusting Power at a Wireless Station to Reduce Inter-channel Interference.

U.S. Appl. No. 12/652,146, Program for Adjusting Channel Interference between Access Points in a Wireless Network.

U.S. Appl. No. 12/437,085, Program for Adjusting Channel Interference between Devices in a Wireless Network.

U.S. Appl. No. 12/359,683, Program for Selecting an Optimum Access Point in a Wireless Network.

U.S. Appl. No. 12/359,545, Method for Selecting an Optimum Access Point in a Wireless Network on a Common Channel.

U.S. Appl. No. 11/866,445, Wireless Network Apparatus and System Filed of the Invention.

U.S. Appl. No. 11/676,542, Program for Distributed Channel Selection, Power Adjustment and Load Balancing Decisions in a Wireless Network.

U.S. Appl. No. 10/673,636, Patent No. 7,606,573, a Wireless Switched Network.

* cited by examiner

| AP ID | Scan Cycle Time | Sync Mark | Countdown Timer | ... |

Pre-scan frame 300

Figure 3

PRE-SCAN FOR WIRELESS CHANNEL SELECTION

CROSS-REFERENCE TO RELATED APPLICATIONS

A claim of priority is made to U.S. Provisional Patent Application 60/733,142, filed Nov. 3, 2005, entitled CHANNEL SELECTION—INITIAL CHANNEL SELECTION, which is incorporated by reference.

FIELD OF THE INVENTION

This invention relates generally to the field of wireless communications, and more particularly to synchronization and transmission power management of fixed location wireless devices to facilitate channel selection.

BACKGROUND OF THE INVENTION

Initial channel selection by fixed location devices such as access points in a wireless network such as a WLAN can be problematic. Many access points are configured to attempt to begin operation on a particular channel, regardless of vendor. If there is a loss of power to the WLAN and all access point s initially attempt to begin operation on a single channel then there is likely to be interference and poor performance. Even if the WLAN is configured to migrate access points to other channels over time, such as under the control of a server, significant delay may be experienced before the WLAN settles into a relatively stable configuration.

BRIEF DESCRIPTION OF THE FIGURES

FIG. 3 illustrates a portion of a pre-scan frame.

DETAILED DESCRIPTION

Figure 1:
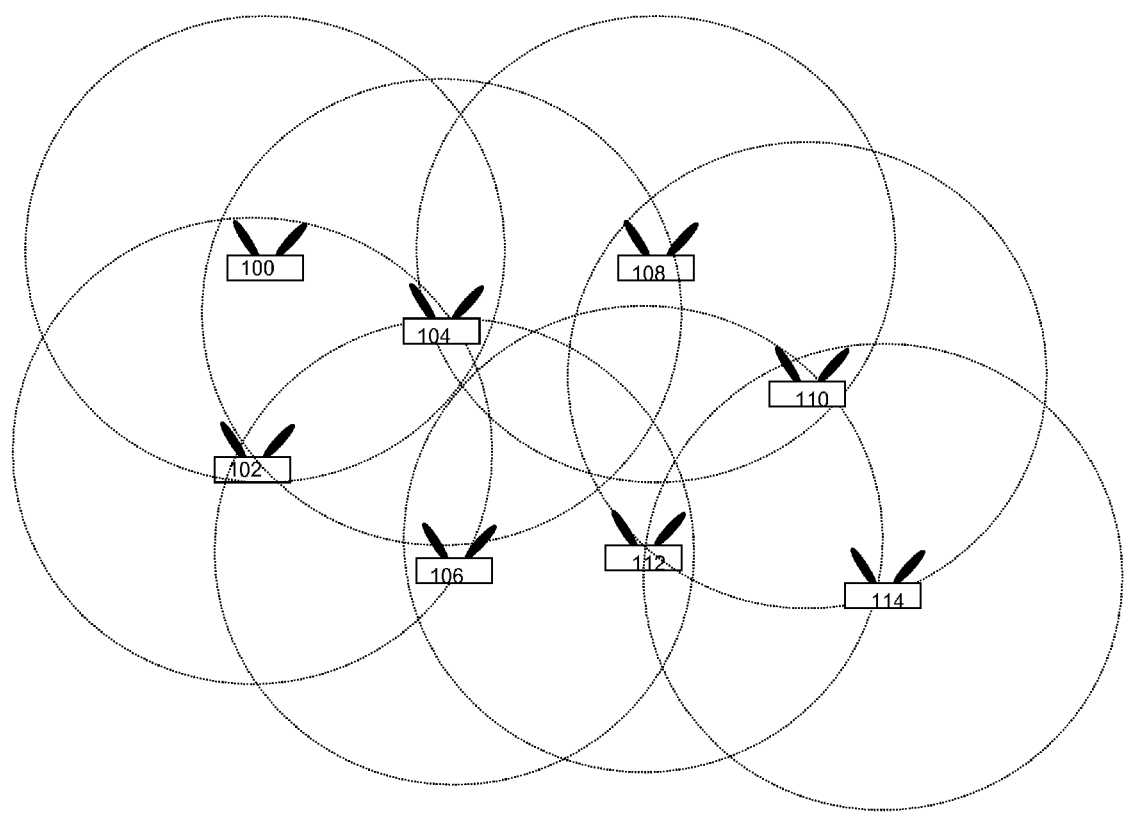
FIG. 1 illustrates access points in a WLAN.

Referring to FIG. 1, initial channel selection occurs when multiple access points (100-114) in a constellation, i.e., with at least some overlap in range, are contemporaneously initialized. This may occur because of power restoration following a failure, because of a switch or server reboot, or for other reasons. The invention is directed to improving channel selection by fixed wireless devices such as access points under such conditions. Because mobile stations do not become associated with access points until channel selection has completed, there are no stations depicted in FIG. 1.

As described in co-pending U.S. patent application Ser. No. 10/780,841, METHOD FOR SCANNING RADIO FREQUENCY CHANNELS, filed Feb. 18, 2004, which is incorporated by reference, initial channel selection includes a plurality of sequential steps (intervals) which are executed by the access points (100-114). From the perspective of access point (104), for example, in the scan interval the access point scans potential radio frequency channels and listens for messages from other access points on those radio frequency channels. Messages received from other access points during channel selection, e.g., access points (100, 102, 106, 108), are used by the access point (104) to construct a scan table having an entry for each access point from which a message is received during the scan interval. The access point also maintains a channel map having an entry for each of the radio frequency channels on which a message was received. Each entry contains the device ID of the access point that sent a message on the corresponding channel. The access point (104) sorts the channel map into a triplet channel map, wherein each successive group of three entries is associated with three successive channels, and wherein the average power is stored in the entry for each channel. The access point then selects, from the triplet channel map, the channel with the lowest center average power. The access point then transmits preclaim messages on the selected channel during a preclaim interval, and listens for messages on the selected channel. The scan table is updated based on each message received on the selected channel during the preclaim interval. The access point also calculates an adjacency vector sum which represents the sum of all average power levels on all channels. During a claim interval, the access point transmits claim messages on the selected channel. The claim messages including the adjacency vector sum. The access point also listens for, and records, messages from other access points on the selected channel, including adjacency vector sums. The access point maintains a claim table having an entry for each device ID that sent a message on the selected channel during the claim interval, and evaluates the claim table at the end of the claim interval. The evaluation includes the following steps:

(1) if the claim table has no entries, causing the access point to commence communications with other devices via the selected channel;

(2) if the claim table has entries, then checking to see if the selected channel was occupied at the beginning of the claim interval, and if the selected channel was not occupied at the beginning of the claim interval, causing the access point to return to scanning channels during a scan interval;

(3) if the selected channel was occupied at the beginning of the claim interval, checking to see if all the claim table entries contain power levels that are less than a power level that was recorded on the selected channel before the claim interval, and if all the claim table entries contain power levels that are less than the power level that was recorded on the selected channel before the claim interval, then causing the access point to commence communications with other devices via the selected channel;

(4) if any claim table entry contains a power level that is greater than the power level that was recorded on the selected channel before the claim interval, then comparing the adjacency vector sum to an adjacency vector that was received in one of the messages, and if the adjacency vector sum is greater than the adjacency vector received, causing the apparatus to commence communications with other devices via the selected channel, otherwise causing the apparatus to return to scanning channels during a scan interval.

The above-described procedure functions quite well where the access points are identical and the WLAN operates in "clean air," i.e., without interference from other devices. However, if the access points are not identical then differences in reboot speed and software execution speed can result in asynchronous operation. This can happen because different access points utilize different operating systems and different hardware. In extreme cases, one access point may complete channel selection before another access point has even begun channel selection. Further, interference caused by other devices may degrade the exchange of messages on which the procedure is partially based. The result is often a non-ideal channel selection.

Figure 2:
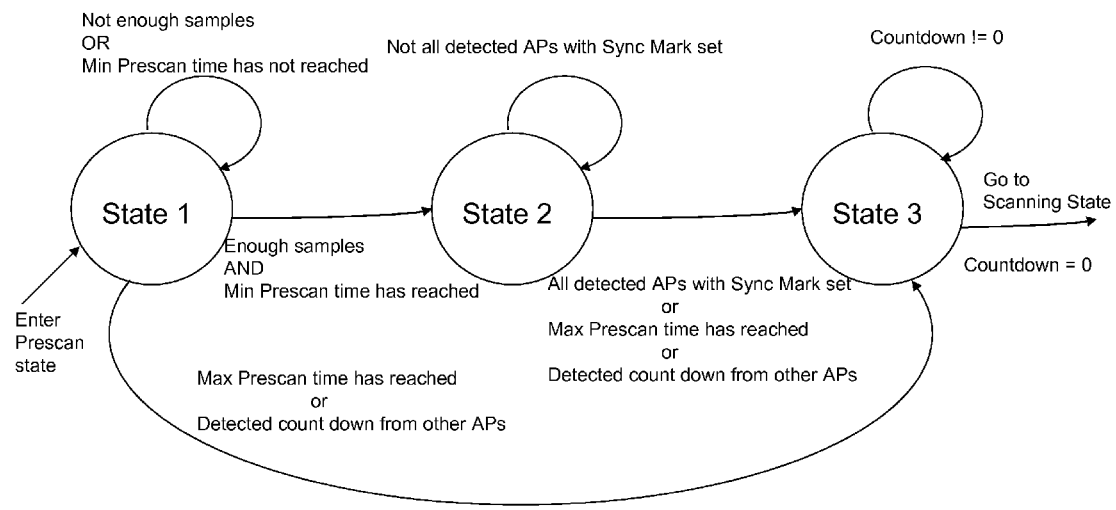
FIG. 2 is a state diagram that illustrates a pre-scan procedure for improving channel selection.

Referring to FIGS. 1 through 3, a pre-scan interval is employed to synchronize the access points (100-114) and facilitate power control. The pre-scan interval precedes the scan interval in the procedure described above. All of the access points begin the pre-scan interval in State 1 on a predetermined channel. Further operation will be described from the perspective of access point (104) for clarity. In State 1, access point (104) is operable to transmit pre-scan frames (300) at full power. The pre-scan frames include a device ID of the transmitting device, e.g., an AP ID such as a MAC address, an advertisement of scan cycle time, and a sync mark bit. The access point also listens for pre-scan frames transmitted by other access points. When a pre-scan frame is received, the received power level and AP ID are noted and used to construct a table. The access point normally remains in State 1 until a minimum number of frame samples have been received from each access point (100, 102, 106, 108) that has been heard, and a minimum pre-scan time has elapsed. For example, the access point (104) may remain in State 1 until twenty samples per access point are received, and at least X seconds have elapsed. However, in extreme circumstances where a max pre-scan time has elapsed, or where a countdown message is received from another access point, thereby indicating that the other access point has moved to State 3, the access point (104) proceeds directly to State 3. Otherwise, under the normal circumstances already described, the access point moves to State 2.

State 2 provides synchronization of transition of the access points between State 1 and State 3. When the access point is in State 2, it continues to transmit pre-scan frames. However, the pre-scan frames now have the sync-mark bit set in order to indicate that the access point is in State 2. The access point continues to listen for pre-scan frames from other access points to determine whether those access points have transitioned to State 2, i.e., by reading the sync-mark bit in the received frames. The access point transitions to State 3 when one of three conditions occurs. The first condition is when all detected access points have transmitted pre-scan frames with the sync-mark bit set, i.e., when all detected access points have signaled readiness to move to State 3. The second condition is when the max pre-scan time has elapsed. The third condition is when countdown messages are received from another access point, thereby indicating that some access points has moved to State 3.

State 3 provides further synchronization. In State 3 the access point begins a countdown to transition to the scan interval, e.g., a 50 ms timer. While counting down, the access point continues to transmit pre-scan frames. However, the pre-scan frames now advertise the state of the countdown timer, e.g., 10 ms until transition to scan interval. The access point continues to listen for pre-scan frames from other access points. If differences in the countdown state are detected, e.g., because of clock speed, the access points re-synchronize. Resynchronization can be accomplished by adopting the countdown state of the slowest clock, i.e., the access point advertising the greatest amount of time remaining until transition to the scan interval. As already discussed, access points in State 1 and State 2 that detect the countdown will immediately transition to State 3, thereby providing further synchronization. When the countdown has elapsed, e.g., when the timer reaches 0, the access point transitions to the scan interval and proceeds with channel selection as already discussed above.

The access points may be further synchronized on the basis of scan cycle time, as advertised in the pre-scan frame (300). As discussed, the scan interval follows the pre-scan interval. In particular, an access point executes pre-scan once, followed by one or more scans. The scan cycle time is the total time required for an access point to go through one channel selection cycle, i.e., from scan to preclaim to claim. Since different access points may be built using different platforms that differ in terms of CPU, OS etc., the different access points can have different scan cycle times. In order for access points that need more than one scan cycle to select a channel, a procedure is executed to cause the access points to synchronize at the end of each scan cycle so that all access points re-enter the scan state contemporaneously. As already described, access points advertise their scan cycle time in the pre-scan frames during the pre-scan interval. In order to synchronize on the basis of scan cycle time, each receiving access point is operative in response to the advertised scan cycle time received from other access points to compare the advertised scan cycle time with the scan cycle time of the receiving access point. If the scan cycle time of the receiving access point is longer than the advertised scan cycle time the receiving access point continues to use its own scan cycle time, and to advertise that scan cycle time in subsequent pre-scan frames. However, if the received scan cycle time is longer then the access point adopts the longer scan cycle time as its own, and advertises that longer scan cycle time in subsequent pre-scan frames. Therefore, all access points eventually converge on the longest scan cycle time, as can be verified by examining the pre-scan frames from all the access points.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative structures, one skilled in the art will recognize that the system may be embodied using a variety of specific structures. Accordingly, the invention should not be viewed as limited except by the scope and spirit of the appended claims.

What is claimed is:

1. A method executed by a first fixed location wireless device for improving initial channel selection in a wireless network where a plurality of fixed location wireless devices are contemporaneously initialized, comprising the steps of:
    transmitting, on a predetermined channel, at least one message including an identifier of the first device;
    transmitting, on the predetermined channel, at least one message indicative of readiness to transition to a subsequent step, wherein transmitting at least one message indicative of readiness to transition to a subsequent step is not executed until (a) a minimum number of messages are received from each identified device, and (b) a predetermined minimum amount of time has elapsed, and further including:
    delaying transition to commencing scanning by a time indicated by a countdown timer;
    transmitting, on the predetermined channel, an indication of countdown timer state; and
    receiving messages including device identifiers from other fixed location wireless devices; and
    commencing scanning for channel selection purposes after the message including the identifier of the first device and the message indicative of readiness have been transmitted.

2. The method of claim 1 wherein delaying transition to commencing scanning by a time indicated by a countdown timer is executed immediately if either (a) a predetermined maximum amount of time has elapsed, or (b) another fixed location wireless device has started a countdown timer to commencing scanning.

3. The method of claim 1 wherein, following transmitting the at least one message indicative of readiness to transition to a subsequent step, delaying transition to commencing scanning by a time indicated by a countdown timer is executed immediately if either (a) each identified device indicates readiness to begin a countdown timer to commencing scanning, or (b) a predetermined maximum amount of time has elapsed, or (c) another fixed location wireless device has started a countdown timer to commencing scanning.

4. The method of claim 1 including the further step of adopting, as countdown timer state, a countdown timer state indicative of greatest amount of time remaining to transition to commencing scanning from countdown timer state advertisements from all detected fixed location wireless devices.

5. A first fixed location wireless device operable to facilitate initial channel selection in a wireless network where a plurality of fixed location wireless devices are contemporaneously initialized, comprising:
  a countdown timer for delaying transition to commencing scanning by a time indicated by the countdown timer;
  a transmitter operable to transmit, on a predetermined channel:
    at least one message including an identifier of the first device,
    an indication of countdown timer state, and
    at least one message indicative of readiness to transition to a subsequent step, wherein the transmitter does not transmit the at least one message indicative of readiness to transition to a subsequent step until (a) a minimum number of messages are received from each identified device, and (b) a predetermined minimum amount of time has elapsed; and
  a receiver operable to receive messages including device identifiers from other fixed location wireless devices, and commence scanning for channel selection purposes after the message including the identifier of the first device and the message indicative of readiness have been transmitted.

6. The device of claim 5 further including circuitry operable to trigger commencement of the subsequent step if either (a) a predetermined maximum amount of time has elapsed, or (b) another fixed location wireless device has started a countdown timer to commencing scanning.

7. The device of claim 5 further including circuitry operable following transmission of the at least one message indicative of readiness to transition to a subsequent step, to trigger commencement of the subsequent step if either if either (a) each identified device indicates readiness to begin a countdown timer to commencing scanning, or (b) a predetermined maximum amount of time has elapsed, or (c) another fixed location wireless device has started a countdown timer to commencing scanning.

8. The device of claim 5 further including circuitry operable to update the countdown timer state to be a countdown timer state indicative of greatest amount of time remaining to transition to commencing scanning from countdown timer state advertisements from all detected fixed location wireless devices.

* * * * *

UNITED STATES PATENT AND TRADEMARK OFFICE
CERTIFICATE OF CORRECTION

PATENT NO. : 8,411,616 B2
APPLICATION NO. : 11/556249
DATED : April 2, 2013
INVENTOR(S) : Yuen It is certified that error appears in the above-identified patent and that said Letters Patent is hereby corrected as shown below:

On the Title Page, item (56), under "OTHER PUBLICATIONS", in Column 2, Line 1, delete "Mediumj" and insert -- Medium --, therefor.

On Title Page 3, item (56), under "OTHER PUBLICATIONS", in Column 2, Line 8, delete "esource" and insert -- resource --, therefor.

In the Specifications:

In Column 4, Line 20, delete "then" and insert -- than --, therefor.

In the Claims:

In Column 6, Lines 17-18, in Claim 7, delete "if either if either" and insert -- if either --, therefor.

Signed and Sealed this
Ninth Day of July, 2013

Teresa Stanek Rea
*Acting Director of the United States Patent and Trademark Office*